(12) United States Patent
Fraisse et al.

(10) Patent No.: US 7,575,712 B2
(45) Date of Patent: Aug. 18, 2009

(54) FERROMAGNETIC ALLOY FOR INDUCTION COOKING

(75) Inventors: Herve Fraisse, Nevers (FR); Thierry Waeckerle, Nevers (FR); Yves Grosbety, Noisy le Grand (FR); Lucien Coutu, London (GB)

(73) Assignee: Imphy Alloys, Puteaux (FR)

( * ) Notice: Subject to any disclaimer, the term of this patent is extended or adjusted under 35 U.S.C. 154(b) by 0 days.

(21) Appl. No.: 10/857,481

(22) Filed: Jun. 1, 2004

(65) Prior Publication Data

US 2006/0192181 A1    Aug. 31, 2006

(51) Int. Cl.
*C22C 38/40* (2006.01)
*C22C 19/05* (2006.01)

(52) U.S. Cl. ............ 420/44; 420/452; 420/584.1; 420/112; 220/573.1

(58) Field of Classification Search ............ None
See application file for complete search history.

(56) References Cited

U.S. PATENT DOCUMENTS

| | | | | |
|---|---|---|---|---|
| 2,053,096 A | * | 9/1936 | Wise et al. ............ | 220/573.1 |
| 3,505,028 A | * | 4/1970 | Douthit ............ | 428/652 |
| 4,646,935 A | * | 3/1987 | Ulam ............ | 220/573.1 |
| 4,705,727 A | * | 11/1987 | Hunter ............ | 428/653 |
| 5,064,055 A | * | 11/1991 | Bessenbach et al. ...... | 220/626 |
| 5,838,080 A | * | 11/1998 | Couderchon et al. ..... | 310/49 R |
| 5,952,112 A | * | 9/1999 | Spring ............ | 428/653 |
| 6,214,401 B1 | * | 4/2001 | Chaput et al. ............ | 426/523 |
| 7,335,428 B2 | * | 2/2008 | Fraisse et al. ............ | 428/675 |
| 2006/0096670 A1 | * | 5/2006 | Waeckerle et al. ........ | 148/310 |

FOREIGN PATENT DOCUMENTS

| | | | |
|---|---|---|---|
| FR | 2689748 | * | 10/1993 |
| JP | 03-229838 | * | 10/1991 |
| JP | 04-083841 | * | 3/1992 |
| WO | WO 03/045208 A1 | * | 6/2003 |

\* cited by examiner

*Primary Examiner*—John J Zimmerman
(74) *Attorney, Agent, or Firm*—Sughrue Mion, PLLC

(57) ABSTRACT

The invention concerns a ferromagnetic alloy whereof the chemical composition comprises, in wt. %: $32.5\% \leq Ni \leq 72.5\%$; $5\% \leq Cr \leq 18\%$; $0.01\% \leq Mn \leq 4\%$; $C \leq 1\%$; optionally one or more elements selected among Mo, V, Co, Cu, Si, W, Nb and Al, the total contents of said elements being not more than 10%, the remainder being iron and impurities resulting from preparation, the chemical composition further satisfying the following relationships: $Cr-1.1Ni+23.25 \leq 0$; $45Cr+11Ni \leq 1360$; $Ni+3Cr \geq 60\%$ if $Ni \geq 37.5$; $Cr \geq 7.5$ if $Ni \leq 37.5$. The invention also concerns the use of said alloy for making heating elements for induction heated cooking appliances.

46 Claims, No Drawings

FERROMAGNETIC ALLOY FOR INDUCTION COOKING

FIELD OF THE INVENTION

The present invention relates to a ferromagnetic alloy more particularly intended for producing heating elements for cooking vessels that are intended for induction cooking.

The cooking of food by induction is carried out by means of an inductor generally replaced beneath a glass-ceramic plate that is transparent to the electromagnetic waves, on which plate the cooking vessel whose contents it is desired to heat is placed. The circulation of the high-frequency current in the inductor creates a magnetic field that induces eddy currents in the vessel, which then heats by the Joule effect. Thus, induction heating involves three successful physical phenomena, these being the transfer of energy from the inductor to the vessel electromagnetically, then the conversion of the electrical energy into heat in the vessel by the Joule effect and finally the transmission of heat via thermal conduction to the food.

The vessel becomes, with the induction, an active element of the heating system since it is within itself that the energy conversion takes place, hence a low thermal inertia and a high energy efficiency.

There are also specific cooking appliances with no glass-ceramic plates, for which the materials forming the subject of this patent must allow the manufacture of cooking vessels.

To achieve good energy efficiency, these vessels have metal bottoms having a high electrical conductivity and a high amplification of the magnetic field at the operating frequencies used, which are between 20 and 50 kHz. It is therefore general practice to use an alloy that is ferromagnetic within the working temperature range of the vessel and that has a magnetization high enough to generate substantial magnetic losses.

These vessels must have a high corrosion resistance as regards the face in contact with the food, but also to a lesser extent as regards the bottom, which must not be degraded when it is being washed.

They must also be mechanically stable so that the vessel maintains its geometry, in particular the flatness of the bottom in contact with the top of the inductor. In fact, when a vessel is heated, its bottom tends to expand. The side wall of the vessel, also called the skirt, is heated to a lower temperature than the bottom and therefore expands less, thereby exerting a radial compressive stress on this bottom. The latter can therefore expand only by blowing out. This degrades the energy efficiency of the assembly and the consumer is disconcerted by the noise and the unpleasantness that it produces. This effect is reversible during the first few times that the vessel is used, but it may lead to irreversible degradation after a large number of these thermal cycles by structural transformation of the materials of the bottom. This phenomenon is particularly sensitive when only the bottom of the vessel contains a highly conductive material (for example aluminum or copper).

In the case of multilayer materials in which the various layers generally have very different expansion coefficients, this difference in coefficient introduces a bimetallic strip effect, which tends both to deform the bottom of the vessel and to make the adhesion of the various layers undergo irreversible change, leading to localized debonding, and therefore to a significant loss of efficiency of the vessel.

To produce these vessels, it is common practice to employ ferritic stainless steels for the ferromagnetic part, such as Fe-17%Cr, or else three-layer symmetrical materials, namely austenitic stainless steel/ferritic stainless steel/austenitic stainless steel. These materials have the drawback of having a Curie temperature above 600° C., which means that the bottoms of these vessels may themselves also reach this temperature, which may result in food loss and degradation of the vessel, this being so even well before this temperature of 600° C.

PRIOR ART

To remedy this problem, FR 2 453 627 proposes the manufacture of a vessel bottom made of a three-layer material comprising an alloy whose Curie point is between 60 and 200° C. As long as the temperature of the vessel is below the Curie point, the alloy is ferromagnetic and induced-current losses that heat the vessel can occur. As soon as the temperature of the vessel exceeds the Curie point, the alloy is no longer ferromagnetic and the heating ceases, to resume again as soon as the temperature of the vessel falls below the Curie point. The vessel is therefore thermally regulated. However, such a material is not suited to the cooking or frying of food, which requires temperatures ranging from 220 to 320° C. to be reached. Furthermore, nothing is proposed in that patent to ensure good geometrical stability of the vessel and good corrosion resistance of both faces of the vessel.

The same principle is adopted in FR 2 689 748, in which it is proposed to manufacture vessels made of a three-layer material that includes an alloy such as Fe64Ni36, the Curie point of which is 250° C. However, this type of alloy has a very mediocre corrosion resistance and a very low expansion coefficient. This alloy is pressed against a metal layer having a markedly higher expansion coefficient, which results in deformation of the vessel bottom by a bimetallic strip effect when it is heated, which deformation may sometimes become irreversible. Furthermore, degradation in the bonding between the layers, due to a cyclic-stress creep and temperature phenomenon, may also be observed.

SUMMARY OF THE INVENTION

The object of the invention is therefore to provide an alloy for producing the heating parts of cooking vessels more particularly intended for induction cooking, these parts deforming neither over the course of time, nor during operation, and the corrosion resistance of which is good on both its faces, said vessel furthermore having to allow food to be cooked or fried at a temperature automatically regulated by the vessel, between 30 and 350° C. Furthermore, this alloy must be able to be processed by pressing, drawing, cutting and machining, or any other suitable process, and must generate high induced-current losses.

DESCRIPTION OF THE PREFERRED EMBODIMENTS

For this purpose, the first subject of the invention is a ferromagnetic alloy whose chemical composition comprises, in percent by weight:

$32.5\% \leq Ni \leq 72.5\%$ $5\% \leq Cr \leq 18\%$ $0.01\% \leq Mn \leq 4\%$ $C \leq 1\%$ optionally one or more elements chosen from Mo, V, Co, Cu, Si, W, Nb and Al, the sum of the contents of these elements being less than or equal to 10%, the balance being iron and impurities resulting from the smelting, the chemical composition furthermore satisfying the following relationships:

Cr−1.1Ni+23.25≦0%

45Cr+11Ni≦1360

Ni+3Cr≧60% if Ni≧37.5

Cr≧7.5 if Ni≦37.5.

In a preferred embodiment, the alloy has a nickel content between 35 and 50%Ni and contains no elements chosen from Mo, V, Co, Cu, Si, W, Nb and Al.

In another preferred embodiment, the alloy furthermore has a chromium content of greater than 13% by weight. This alloy has the advantage of being able to be used as a single material for the vessel in terms of compatibility with food on the internal face of the vessel, as the alloy is then a food-grade alloy.

In another preferred embodiment, the alloy has a nickel content of between 48 and 52% and a chromium content between 7 and 10%.

In another preferred embodiment, the alloy has a nickel content of greater than or equal to 52% and more particularly preferably greater than 55%.

In another preferred embodiment, the alloy has a manganese content of greater than or equal to 0.1% so as to make the alloy easier to process.

In another preferred embodiment, the alloy has a manganese content of less than or equal to 0.5%.

In another preferred embodiment, the alloy has a Curie temperature $T_c$ of between 30 and 350° C., a thermal expansion coefficient $\alpha_{TC}$ between room temperature and $T_c$ of greater than or equal to $6.5\times10^{-6}$ $K^{-1}$, or even greater than $9\times10^{-6}$ $K^{-1}$, and a saturation induction $B_s$ of greater than or equal to 0.2 T, or even greater than 0.5 T, and the maximum oxidation current $I_{max}$ of said alloy in a voltage-current corrosion test in acid medium is less than 1 mA.

A second subject of the invention is the use of an alloy according to the invention for producing monolayer or multilayer heating elements, such as monolayer bottoms, for cooking vessels intended for induction cooking.

The nickel and chromium contents of the alloy according to the invention make it possible to achieve good drawability, mechanical cutability, pressability and machinability. They also make it possible to achieve good oxidation resistance in air, and also very good hot corrosion resistance.

Furthermore, the alloy according to the invention exhibits good corrosion resistance in a humid atmosphere, in acid medium and in basic medium, in particular as regards aesthetic appearance and nondegradability of the vessel. To determine the corrosion resistance of the alloy, a current I/voltage U test is carried out in 0.01M sulfuric acid medium, taking the alloy as one electrode and imposing various voltage values relative to a platinum electrode. Various values of I in correspondence with various values of U are measured and the maximum value $I_{max}$ of I that characterizes the corrosion resistance of the alloy is determined. In order for the magnetic alloy not to be visually affected on the surface by corrosion in a basic or acid medium or in a humid atmosphere, it is necessary that $I_{max}$<1 mA, which condition is met by the alloy according to the invention.

The present inventors have also been able to demonstrate that the alloy according to the invention has a Curie temperature of between 30 and 350° C., which makes it possible to stabilize the temperature within the usual cooking range for food and below the threshold for degradation of the possible nonstick coatings. The Curie temperature of the alloy is preferably less than or equal to 320° C.

Such a function of the alloy makes it possible to prevent both accidental burning of the food and the user, and the accelerated degradation of the vessel owing to the coupled effects of the temperature and the fatigue under cyclic mechanical stresses by the bimetallic strip effect when the alloy is pressed against another material.

Moreover, the alloy according to the invention has an expansion coefficient of greater than or equal to $6.5\times10^{-6}$ $K^{-1}$ and preferably greater than or equal to $9\times10^{-6}$ $K^{-1}$. When it is pressed or bonded against another material allowing good heat diffusion, such as aluminum for example, this characteristic allows the bottom of the container to be dimensionally very stable, in particular when a ferritic or austenitic stainless steel is pressed against the other side of the aluminum layer.

This feature of the alloy according to the invention also makes it possible, in combination with its heating being limited to 350° C., to guarantee that its bonding to an aluminum layer withstands many hours of operation.

The two factors that accelerate the aging of this bond are the temperature and the bimetallic strip effect associated with the difference in expansion coefficient between aluminum and the ferromagnetic alloy. The temperature factor is greatly restricted by the temperature self-regulation associated with the Curie point.

The bimetallic strip effect due to the differences in thermal expansion coefficient of the materials could generate reciprocal stresses between the materials and therefore, in operation, a creep phenomenon thermally activated under cyclic stress, leading little by little to the materials assuming the hot stable form despite the rigidity that may be initially given by a thick layer of one of the materials. This would result in the bottom of the vessel bowing out, or else in deterioration of the interlayer bonding by the same creep mechanism, resulting in localized debonding, loss of heating efficiency of the vessel and magnetostrictive noise therein. By balancing the composition of the alloy according to the invention, a material is obtained whose thermal expansion coefficient between room temperature and the Curie temperature is relatively close to that of aluminum and of ferritic and austenitic stainless steels, minimizing or even eliminating the bimetallic strip effect.

The combination of these two features of the alloy therefore makes it possible to achieve a lasting bond with these materials.

EXAMPLE 1

A magnetic alloy, the composition of which contained 39.3% iron, 50% nickel, 10% chromium, 0.5% manganese and 0.2% silicon, was produced. This alloy had a Curie temperature $T_{C1}$ of about 230° C. and a thermal expansion coefficient between room temperature and 230° C., $\alpha_{25\text{-}230°\ C.}$, of $10\times10^{-6}$ $K^{-1}$. Pressed onto a strip of this alloy was a strip of aluminum, the thermal expansion coefficient of which at 0° C., $\alpha_{0°\ C.}$, was greater than or equal to $22\times10^{-6}$ $K^{-1}$ and then pressed onto this aluminum strip was a strip of an alloy containing 79.5% iron, 20% chromium and 0.5% titanium, the Curie temperature $T_{C2}$ of which was substantially higher than $T_{C1}$ and the thermal expansion coefficient of which between 25 and 320° C., $\alpha_{25\text{-}320°\ C.}$, was about $11.6\times10^{-6}$ $K^{-1}$.

After various trials, it was possible to demonstrate that the use of a ferromagnetic layer with a high Curie point ($T_{C2}$) on the inner face of the vessel produced little heat when $T>T_{C1}$. The multilayer aged little after 1000 h of operation and was dimensionally very stable. The temperature of the multilayer always stabilized around the same value below $T_{C1}$ when various induction heating trials were carried out with the same food, thereby allowing it to be cooked rapidly and reproducibly in terms of time and quality. Finally, no oxidation stain was observed after intensive kitchen use by being heated on a gas ring and washed in a dishwasher.

This combination was therefore particularly suitable for the manufacture of a vessel for cooking at a regulated temperature of around 230° C., for cooking food such as rice, fish and meat.

EXAMPLE 2

A magnetic alloy, the composition of which contained 41.8% iron, 45% nickel, 13% chromium and 0.2% manganese, was produced. This alloy had a Curie temperature $T_{C1}$ of about 150° C. and a thermal expansion coefficient at 0° C., $\alpha_{0°\ C.}$, of $9.6 \times 10^{-6}$ K$^{-1}$. Pressed onto a strip of this alloy was a strip of aluminum whose coefficient $\alpha_{0°\ C.}$ was greater than or equal to $22 \times 10^{-6}$ K$^{-1}$ and then pressed onto this strip of aluminum was a strip of an alloy containing 79.5% iron, 20% chromium and 0.5% titanium, the Curie temperature $T_{C2}$ of which was well above $T_{C1}$ and the thermal expansion coefficient between 25° C. and 320° C., $\alpha_{25\text{-}320°\ C.}$, of which was about $11.6 \times 10^{-6}$ K$^{-1}$.

After various trials, it was possible to demonstrate that the use of a ferromagnetic layer with a high Curie point ($T_{C2}$) on the inner face of the vessel produced little heat when $T > T_{C1}$. The multilayer aged little after 1000 h of operation and was dimensionally very stable. Furthermore, the temperature of the multilayer always stabilized around the same value below $T_{C1}$ when various induction heating trials were carried out with the same food, thereby allowing it to be cooked rapidly and reproducibly in terms of time and quality. Finally, no oxidation stain was observed after intensive kitchen use by being heated on a gas ring and washed in a dishwasher.

This combination was therefore particularly suitable for the manufacture of a vessel for cooking at a regulated temperature of around 140° C.-160° C., for cooking food such as vegetables, fruit or water at low pressure.

EXAMPLE 3

A magnetic alloy, the composition of which contained 54.8% to 56.8% iron, 33% nickel, 10 to 12% chromium and 0.2% manganese, was produced. This alloy had a Curie temperature that could vary between 37 and 70° C. and a thermal expansion coefficient at 0° C., $\alpha_{0°\ C.}$, of 8 to $9.1 \times 10^{-6}$ K$^{-1}$. Pressed onto a strip of this alloy having a thickness of 0.6 mm was a strip of aluminum with a thickness of at least 5 mm, the thermal expansion coefficient of which at 0° C., $\alpha_{0°\ C.}$, was greater than or equal to $22 \times 10^{-6}$ K$^{-1}$.

After various trials, it was possible to demonstrate here too that this bilayer did not age after 1000 h of operation and it remained dimensionally very stable. The temperature of the multilayer always stabilized around the same value very close to 37° C. when various induction heating trials were carried out with combinations of material thickness and/or various vessel geometries, thereby producing products compatible temperaturewise with the human body. Furthermore, no oxidation stain was observed after intensive use in a medical or domestic environment.

This combination was therefore particularly suitable for a heater intended for the human body, such as a feeding bottle warmer, a device for regulating the temperature of blood or plasma, a baby incubator, a medical intervention heater, etc., since it makes it possible to have very great temperature uniformity self-regulated at 37° C. over large areas.

EXAMPLE 4

Thirty-one alloys of 50 kg of material were produced by vacuum smelting from high-purity metals and were cast into ingots. After forging and hot-rolling down to a thickness of 4.5 mm, these various metals were then cold-rolled directly to the final thickness of 0.6 mm, cut into specimens of various shapes for characterizing the expansion coefficient between 20° C. and $T_C$, $\alpha_{TC}$, the Curie point $T_C$, the saturation induction $B_s$ and the maximum oxidation current $I_{max}$, and were annealed at 1050° C. for 1 h in hydrogen:

$\alpha_{TC}$ was measured on a dilatometer;

$B_s$ was measured by extraction of a specimen from the field (1600 Oe) of a magnet between two detection coils connected to a galvanometer, the measurement being to within less than 3%;

$T_C$ was measured on a magnetic-force thermomagnetometer by extrapolating to 0 the tangent to the force-temperature curve at the point of inflexion of this curve; and $I_{max}$ was the maximum current recorded on a current-voltage oxidation curve in which successive voltage values were imposed between the alloy electrode and a platinum electrode in a 0.01M sulfuric acid solution.

The compositions of these alloys (apart from the iron that makes up the balance) are given in the following table:

| Alloy | C (%) | Ni (%) | Cr (%) | Mn (%) | Co (%) | Mo (%) | Si (%) | Al (%) | Cu (%) |
|---|---|---|---|---|---|---|---|---|---|
| 1 (comp.) | 0.0089 | 33.96 | 2.64 | 0.259 | 1.96 | <0.01 | 0.032 | <0.02 | <0.01 |
| 2 (comp.) | 0.0094 | 35.77 | 5.6 | 0.306 | 1.01 | <0.01 | 0.035 | <0.02 | <0.01 |
| 3 (inv.) | 0.0083 | 35.8 | 9.05 | 0.3 | 1.04 | <0.01 | <0.02 | <0.02 | <0.01 |
| 4 (comp.) | 0.009 | 37.69 | 3.14 | 0.296 | 1.06 | <0.01 | 0.031 | <0.02 | <0.01 |
| 5 (comp.) | 0.0092 | 37.74 | 5.76 | 0.308 | 0.969 | <0.01 | 0.033 | <0.02 | <0.01 |
| 6 (inv.) | 0.0091 | 37.75 | 9.54 | 0.3 | 1.02 | <0.01 | <0.02 | <0.02 | <0.01 |
| 7 (inv.) | 0.0089 | 37.45 | 8.72 | 0.3 | 3.06 | <0.01 | <0.02 | <0.02 | <0.01 |
| 8 (comp.) | 0.0066 | 33.46 | 4.88 | 0.133 | <0.01 | <0.01 | 0.02 | <0.02 | <0.01 |
| 9 (inv.) | 0.0041 | 33.66 | 7.95 | 0.188 | <0.01 | <0.01 | <0.02 | <0.02 | <0.01 |
| 10 (comp.) | 0.074 | 34.24 | 2.01 | 0.172 | 0.026 | 5.79 | <0.02 | <0.02 | <0.01 |
| 11 (inv.) | 0.0086 | 37.63 | 9.31 | 0.293 | 0.503 | 0.023 | <0.02 | <0.02 | 0.094 |
| 12 (inv.) | 0.0096 | 39.49 | 9.6 | 0.287 | 1.02 | 0.01 | 0.021 | <0.02 | <0.01 |
| 13 (comp.) | 0.015 | 33.78 | 2.02 | 0.186 | <0.01 | 2.03 | <0.02 | <0.02 | <0.01 |
| 14 (comp.) | 0.013 | 33.78 | 0.02 | 0.183 | <0.01 | 2.21 | <0.02 | <0.02 | <0.01 |
| 15 (inv.) | 0.01 | 49.9 | 9.6 | 0.49 | <0.01 | <0.01 | 0.2 | <0.02 | <0.01 |

-continued

| Alloy | C (%) | Ni (%) | Cr (%) | Mn (%) | Co (%) | Mo (%) | Si (%) | Al (%) | Cu (%) |
|---|---|---|---|---|---|---|---|---|---|
| 16 (comp.) | 0.002 | 36.03 | 0.038 | 0.042 | 0.039 | 0.012 | 0.059 | <0.02 | 0.017 |
| 17 (comp.) | 0.0057 | 42 | — | — | <0.01 | <0.01 | <0.02 | <0.02 | <0.01 |
| 18 (inv.) | 0.0025 | 42 | 6 | 0.21 | <0.01 | <0.01 | 0.18 | 0.17 | <0.01 |
| 19 (inv.) | 0.0021 | 47 | 5 | 0.221 | <0.01 | <0.01 | <0.02 | <0.02 | <0.01 |
| 20 (inv.) | 0.0026 | 47 | 6 | 0.133 | <0.01 | <0.01 | <0.02 | <0.02 | <0.01 |
| 21 (comp.) | 0.003 | 47.58 | 0.034 | 0.472 | 0.038 | 0.01 | 0.092 | <0.02 | 0.026 |
| 22 (comp.) | 0.0057 | 55.3 | 3.8 | 0.277 | 0.024 | 0.011 | <0.02 | <0.02 | <0.01 |
| 23 (comp.) | 0.0062 | 72.5 | 3.1 | 0.234 | 0.022 | <0.01 | <0.02 | <0.02 | <0.01 |
| 24 (comp.) | 0.0042 | 65.5 | 15.1 | 0.255 | 0.015 | <0.01 | <0.02 | <0.02 | <0.01 |
| 25 (inv.) | 0.0036 | 70.2 | 9.8 | 0.243 | <0.01 | <0.01 | <0.02 | <0.02 | <0.01 |
| 26 (inv.) | 0.0087 | 62 | 7.4 | 0.261 | <0.01 | <0.01 | <0.02 | <0.02 | <0.01 |
| 27 (inv.) | 0.0052 | 55 | 14.8 | 0.252 | <0.01 | <0.01 | <0.02 | <0.02 | <0.01 |
| 28 (comp.) | 0.0068 | 50.2 | 19.7 | 0.241 | <0.01 | <0.01 | <0.02 | <0.02 | <0.01 |
| 29 (comp.) | 0.0035 | 39.9 | 20.1 | 0.233 | <0.01 | <0.01 | <0.02 | <0.02 | <0.01 |
| 30 (inv.) | 0.0045 | 45.5 | 15.3 | 0.228 | <0.01 | <0.01 | <0.02 | <0.02 | <0.01 |
| 31 (comp.) | 0.0066 | 32.3 | 17.4 | 0.262 | <0.01 | <0.01 | <0.02 | <0.02 | <0.01 |

The results of the trials carried out are given in the table below:

| Alloy | $\alpha_{Tc}$ ($10^{-6} K^{-1}$) | $B_S$ (T) | $T_C$ (° C.) | $I_{max}$ (mA) |
|---|---|---|---|---|
| 1 (comp.) | 4.30 | 1.085 | 205 | 1.20 |
| 2 (comp.) | 5.10 | 0.91 | 181 | 0.25 |
| 3 (inv.) | 8.25 | 0.65 | 127 | 0.90 |
| 4 (comp.) | 4.50 | 1.225 | 252 | 1.10 |
| 5 (comp.) | 6.05 | 0.985 | 214 | 0.25 |
| 6 (inv.) | 7.70 | 0.725 | 154 | 0.60 |
| 7 (inv.) | 7.82 | 0.795 | 182 | 0.90 |
| 8 (comp.) | 5.00 | 0.76 | 149 | 0.50 |
| 9 (inv.) | 7.90 | 0.53 | 98 | 0.60 |
| 10 (comp.) | 7.74 | 0.545 | 87 | 1.20 |
| 11 (inv.) | 7.70 | 0.675 | 137 | 0.80 |
| 12 (inv.) | 8.08 | 0.74 | 163 | 0.60 |
| 13 (comp.) | 4.50 | 0.81 | 125 | 1.50 |
| 14 (comp.) | 3.80 | 0.87 | 143 | 3.00 |
| 15 (inv.) | 10.50 | 0.745 | 232 | 0.60 |
| 16 (comp.) | 2.90 | 1.30 | 250 | 6.20 |
| 17 (comp.) | 5.00 | 1.50 | 330 | 5.70 |
| 18 (inv.) | 8.10 | 1.11 | 256 | 0.25 |
| 19 (inv.) | 9.30 | 1.25 | 340 | 0.50 |
| 20 (inv.) | 9.75 | 1.18 | 350 | 0.25 |
| 21 (comp.) | 8.10 | 1.60 | 450 | 5.00 |
| 22 (comp.) | 10.00 | 1.14 | 390 | 1.40 |
| 23 (comp.) | 11.60 | 0.90 | 330 | 1.10 |
| 24 (comp.) | 11.80 | 0.13 | 10 | 0.15 |
| 25 (inv.) | 11.70 | 0.45 | 190 | 0.32 |
| 26 (inv.) | 11.20 | 0.87 | 340 | 0.22 |
| 27 (inv.) | 10.80 | 0.30 | 100 | 0.17 |
| 28 (comp.) | 10.40 | <0.01 | −50 | 0.12 |
| 29 (comp.) | 9.70 | <0.01 | −80 | 0.16 |
| 30 (inv.) | 9.50 | 0.20 | 120 | 0.33 |
| 31 (comp.) | 11.20 | <0.01 | −30 | 0.31 |

When it is desired to manufacture a vessel characterized by a $T_{max}$ value between 30 and 350° C., defined by the mode of cooking and the type of food that it is intended to prepare in this vessel, it may be seen that it is sufficient to select within the compositional range claimed the alloy that has the Curie point corresponding to this temperature $T_{max}$.

It may also be seen that the alloys having a nickel content greater than 52% exhibit both excellent corrosion resistance and a high thermal expansion coefficient.

The invention claimed is:

1. A process for producing a heating element for cooking vessels for induction cooking comprising:

forming a ferromagnetic alloy having a chemical composition comprising, in percent by weight:

32.5%≦Ni≦72.5%;

7.4%≦Cr≦18%

0.01%≦Mn≦4%;

C≦1%;

0≦Cu≦0.01; and the balance being iron and impurities resulting from the smelting, wherein the chemical composition further satisfies the following relationships:

Cr−1.1Ni+23.25≦0%;

45Cr+11Ni≦1360;

Ni+3Cr≧60% if Ni≧37.5; and

Cr≧7.5 if Ni≦37.5 and forming the heating element comprising the ferromagnetic alloy,
wherein the heating element has a side wall.

2. The process as claimed in claim 1, wherein the chromium content of said alloy is greater than 13%.

3. The process as claimed in claim 1 or 2, wherein the nickel content of said alloy is between 34 and 50% and that the alloy does not contain Mo, V, Co, Cu, Si, W, Nb and Al.

4. The process as claimed in claim 1 or 2, wherein the nickel content of said alloy is greater than 52%.

5. The process as claimed in claim 1, wherein the nickel content of said alloy is between 48 and 52% and the chromium content is between 7.4 and 10%.

6. The process as claimed in claims 1 or 2, wherein the manganese content of said alloy is greater than or equal to 0.1%.

7. The process as claimed in claim 1 or 2, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ K$^{-1}$ and a saturation induction $B_s$ of greater than or equal to 0.2 T and the maximum oxidation current $I_{max}$ of said alloy in a voltage-current corrosion test in acid medium is less than 1 mA.

8. The process as claimed in claim 7, wherein the thermal expansion coefficient $\alpha_{TC}$ between room temperature and $T_c$ of said alloy is greater than or equal to $9 \times 10^{-6}$ K$^{-1}$ and the saturation induction $B_s$ is greater than or equal to 0.5 T.

9. A process for producing a bottom of monolayer cooking vessels intended for induction cooking comprising, forming a monolayer of a ferromagnetic alloy having a chemical composition comprising, in percent by weight:
ti 32.5%≦Ni≦72.5%;

13%≦Cr≦18%;

0.01%≦Mn≦4%;

C≦1%;

the balance being iron and impurities resulting from smelting, wherein the chemical composition further satisfies the following relationships:

Cr−1.1Ni+23.25≦0%;

45Cr+11Ni≦1360;

Ni+3Cr≧60% if Ni≧37.5; and

Cr≧7.5 if Ni≦37.5 and forming the bottom of the monolayer cooking vessel comprising the ferromagnetic alloy, wherein the cooking vessel has a side wall.

10. The process as claimed in claim 1, wherein the chemical composition further comprises one or more elements selected from the group consisting of Mo, V, Co, Cu, Si, W, Nb and Al, the sum of the contents of these elements being less than or equal to 10%.

11. The process as claimed in claim 1, wherein the chemical composition does not contain any Mo, V, Co, Cu, Si, W, Nb and Al.

12. The process as claimed in claim 3, wherein the manganese content of said alloy is greater than or equal to 0.1%.

13. The process as claimed claim 4, wherein the manganese content of said alloy is greater than or equal to 0.1%.

14. The process as claimed in claim 5, wherein the manganese content of said alloy is greater than or equal to 0.1%.

15. The process as claimed in claim 3, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ K$^{-1}$ and a saturation induction $B_s$ of greater than or equal to 0.2 T and the maximum oxidation current $I_{max}$ of said alloy in a voltage-current corrosion test in acid medium is less than 1 mA.

16. The process as claimed in claim 15, wherein the thermal expansion coefficient $\alpha_{TC}$ between room temperature and $T_c$ of said alloy is greater than or equal to $9 \times 10^{-6}$ K$^{-1}$ and the saturation induction $B_c$ is greater than or equal to 0.5 T.

17. The process as claimed in claim 4, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ K$^{-1}$ and a saturation induction $B_s$ of greater than or equal to 0.2 T and the maximum oxidation current $I_{max}$ of said alloy in a voltage-current corrosion test in acid medium is less than 1 mA.

18. The process as claimed in claim 17, wherein the thermal expansion coefficient $\alpha_{TC}$ between room temperature and $T_c$ of said alloy is greater than or equal to $9 \times 10^{-6}$ K$^{-1}$ and the saturation induction $B_s$ is greater than or equal to 0.5 T.

19. The process as claimed in claim 5, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ K$^{-1}$ and a saturation induction $B_s$ of greater than or equal to 0.2 T and the maximum oxidation current $I_{max}$ of said alloy in a voltage-current corrosion test in acid medium is less than 1 mA.

20. The process as claimed in claim 19, wherein the thermal expansion coefficient $\alpha_{TC}$ between room temperature and $T_c$ of said alloy is greater than or equal to $9 \times 10^{-6}$ K$^{-1}$ and the saturation induction $B_s$ is greater than or equal to 0.5 T.

21. The process as claimed in claim 6, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ K$^{-1}$ and a saturation induction $B_s$ of greater than or equal to 0.2 T and the maximum oxidation current $I_{max}$ of said alloy in a voltage-current corrosion test in acid medium is less than 1 mA.

22. The process as claimed in claim 21, wherein the thermal expansion coefficient $\alpha_{TC}$ between room temperature and $T_c$ of said alloy is greater than or equal to $9 \times 10^{-6}$ K$^{-1}$ and the saturation induction $B_s$ is greater than or equal to 0.5 T.

23. The process as claimed in claim 9, wherein the chemical composition further comprises one or more elements selected from the group consisting of Mo, V, Co, Cu, Si, W, Nb and Al, the sum of the contents of these elements being less than or equal to 10%.

24. A heating element for cooking vessels for induction cooking comprising:

a ferromagnetic alloy having a chemical composition comprising, in percent by weight:

32.5%≦Ni≦72.5%;

7.4%≦Cr≦18%

0.01%≦Mn≦4%;

C≦1%;

0≦Cu≦0.01; and the balance being iron and impurities resulting from the smelting, wherein the chemical composition further satisfies the following relationships:

Cr−1.1Ni+23.25≦0%;

45Cr+11Ni≦1360;

Ni+3Cr≧60% if Ni≧37.5; and

Cr≧7.5 if Ni≦37.5 wherein the heating element has a side wall.

25. The heating element as claimed in claim 24, wherein the chromium content of said alloy is greater than 13%.

26. The heating element as claimed in claim 24 or 25, wherein the nickel content of said alloy is between 34 and 50% and that the alloy does not contain Mo, V, Co, Cu, Si, W, Nb and Al.

27. The heating element as claimed in claim 24 or 25, wherein the nickel content of said alloy is greater than 52%.

28. The heating element as claimed in claim 24, wherein the nickel content of said alloy is between 48 and 52% a and the chromium content is between 7.4 and 10%.

29. The heating element as claimed in claims 24 or 25, wherein the manganese content of said alloy is greater than or equal to 0.1%.

30. The heating element as claimed in claim 24 or 25, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ $K^{-1}$ and a saturation induction $B_s$ of greater than or equal to 0.2 T and the maximum oxidation current $I_{max}$ of said alloy in a voltage-current corrosion test in acid medium is less than 1 mA.

31. The heating element as claimed in claim 30, wherein the thermal expansion coefficient $\alpha_{TC}$ between room temperature and $T_c$ of said alloy is greater than or equal to $9 \times 10^{-6}$ $K^{-1}$ and the saturation induction $B_s$ is greater than or equal to 0.5 T.

32. A heating element for producing bottoms of monolayer cooking vessels intended for induction cooking comprising,
a monolayer of a ferromagnetic alloy having a chemical composition comprising, in percent by weight:

32.5%≦Ni≦72.5%;

13%≦Cr≦18%

0.01%≦Mn≦4%;

C≦1%;

the balance being iron and impurities resulting from smelting, wherein the chemical composition further satisfies the following relationships:

Cr−1.1Ni+23.25≦0%;

45Cr+11Ni≦1360;

Ni+3Cr≧60% if Ni≧37.5; and

Cr≧7.5 if Ni≦37.5 wherein the heating element has a side wall.

33. The heating element as claimed in claim 24, wherein the chemical composition further comprises one or more elements selected from the group consisting of Mo, V. Co, Cu, Si, W, Nb and Al, the sum of the contents of these elements being less than or equal to 10%.

34. The heating element as claimed in claim 24, wherein the chemical composition does not contain any Mo, V, Co, Cu, Si, W, Nb and Al.

35. The heating element as claimed in claim 26, wherein the manganese content of said alloy is greater than or equal to 0.1%.

36. The heating element as claimed claim 27, wherein the manganese content of said alloy is greater than or equal to 0.1%.

37. The heating element as claimed in claim 28, wherein the manganese content of said alloy is greater than or equal to 0.1%.

38. The heating element as claimed in claim 26, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ $K^{-1}$ and a saturation induction $B_s$ of greater than or equal to 0.2 T and the maximum oxidation current $I_{max}$ of said alloy in a voltage-current corrosion test in acid medium is less than 1 mA.

39. The heating element as claimed in claim 38, wherein the thermal expansion coefficient $\alpha_{TC}$ between room temperature and $T_c$ of said alloy is greater than or equal to $9 \times 10^{-6}$ $K^{-1}$ and the saturation induction $B_s$ is greater than or equal to 0.5 T.

40. The heating element as claimed in claim 27, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ $K^{-1}$ and a saturation induction $B_s$ of greater than or equal to 0.2 T and the maximum oxidation current $I_{max}$ of said alloy in a voltage-current corrosion test in acid medium is less than 1 mA.

41. The heating element as claimed in claim 40, wherein the thermal expansion coefficient $\alpha_{TC}$ between room temperature and $T_c$ of said alloy is greater than or equal to $9 \times 10^{-6}$ $K^{-1}$ and the saturation induction $B_s$ is greater than or equal to 0.5 T.

42. The heating element as claimed in claim 28, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ $K^{-1}$ and a saturation induction $B_s$ of greater than or equal to 0.2 T and the maximum oxidation current $I_{max}$ of said alloy in a voltage-current corrosion test in acid medium is less than 1 mA.

43. The heating element as claimed in claim 42, wherein the thermal expansion coefficient $\alpha_{TC}$ between room temperature and $T_c$ of said alloy is greater than or equal to $9 \times 10^{-6}$ $K^{-1}$ and the saturation induction $B_s$ is greater than or equal to 0.5 T.

44. The heating element as claimed in claim 29, wherein said alloy has a Curie temperature $T_c$ of between 30 and 350° C., a thermal expansion coefficient $\alpha_{TC}$ between room temperature and $T_c$ of greater than or equal to $6.5 \times 10^{-6}$ $K^{-1}$ and a saturation induction $B_s$ of greater than or equal to 0.2 T and the maximum oxidation current $I_{max}$ of said alloy in a voltage-current corrosion test in acid medium is less than 1 mA.

45. The heating element as claimed in claim 44, wherein the thermal expansion coefficient $\alpha_{TC}$ between room temperature and $T_c$ of said alloy is greater than or equal to $9 \times 10^{-6}$ $K^{-1}$ and the saturation induction $B_s$ is greater than or equal to 0.5 T.

46. The heating element as claimed in claim 32, wherein the chemical composition further comprises one or more elements selected from the group consisting of Mo, V, Co, Cu, Si, W, Nb and Al, the sum of the contents of these elements being less than or equal to 10%.

* * * * *